United States Patent

Egan et al.

[11] Patent Number: 5,315,861
[45] Date of Patent: May 31, 1994

[54] METHOD AND APPARATUS FOR INSPECTION OF OPEN FACE HONEYCOMB STRUCTURES

[75] Inventors: George P. Egan, Union, Ky.; Karl L. Borneman, Loveland; Douglas A. Jaeger, Cincinnati, both of Ohio

[73] Assignee: General Electric Company, Cincinnati, Ohio

[21] Appl. No.: 963,194

[22] Filed: Oct. 19, 1992

[51] Int. Cl.⁵ .............................. G01M 3/26
[52] U.S. Cl. ...................... 73/37; 73/150 A
[58] Field of Search ............... 73/37, 37.5, 38, 46, 73/52, 159, 150 A, 160

[56] References Cited

U.S. PATENT DOCUMENTS

| | | | |
|---|---|---|---|
| 2,694,924 | 11/1954 | Matlock et al. | 73/37 |
| 2,842,957 | 7/1958 | Bacon, Jr. | |
| 3,996,788 | 12/1976 | Purves | 73/159 X |
| 4,043,179 | 8/1977 | Ingle, Jr. | |
| 4,052,885 | 10/1977 | Shuck | |
| 4,326,405 | 4/1982 | Ingle, Jr. | |
| 4,393,699 | 7/1983 | Seiler, Jr. | 73/37 |
| 4,501,504 | 2/1985 | Urmenyi et al. | 374/153 X |
| 4,809,527 | 3/1989 | Mitchell | 72/12 |
| 5,078,005 | 1/1992 | Krempel et al. | |
| 5,127,260 | 7/1992 | Robertson | 73/37 |

FOREIGN PATENT DOCUMENTS 770550  3/1957  United Kingdom .

*Primary Examiner*—Daniel M. Yasich
*Attorney, Agent, or Firm*—Jerome C. Squillaro; Charles L. Moore, Jr.

[57] ABSTRACT

A method and apparatus for detecting defects in a structure formed of a honeycomb matrix bonded to a support surface including providing a probe body including means defining a fluid passage forming a supply port to an exterior surface of the probe body; connecting a pressurized fluid source to the fluid passage at a location distal from the supply port; placing the supply port in close proximity to a cell of the honeycomb matrix; supplying fluid from the compressed fluid source to the cell via the fluid passage; and monitoring a fluid pressure produced at a portion of the honeycomb matrix adjacent to the supply port to detect disbonds between the honeycomb matrix and support surface.

6 Claims, 3 Drawing Sheets

METHOD AND APPARATUS FOR INSPECTION OF OPEN FACE HONEYCOMB STRUCTURES

RELATED APPLICATIONS

The present application is related to co-pending patent application Ser. No. 07/963,293, filed Oct. 19, 1992, entitled "Apparatus and Method for Inspecting an Open-Face Cell Structure Bonded to a Substrate", by Karl L. Borneman et al., which is assigned to the same assignee as the present invention.

BACKGROUND OF THE INVENTION

The present invention relates to inspection of an open-face cell structure bonded to a substrate and, more particularly, to an apparatus and method for inspecting an open face honeycomb cell structure of the type commonly used in the aircraft and aerospace industry, including use in gas turbine engines for aircraft propulsion as a seal between non-rotating outer casings and inner rotating components, such as gas turbine engine blades.

Rotating components of a gas turbine engine, such as the fan section, turbine section and compressor casing or lining having an interior portion formed of a cell structure having a multiplicity of cells which are typically six sided. These cell structures are commonly referred to as honeycomb because of the distinctive shape of the cells. The interior of each of the hexagonal cells is open and one end of the cell structure is bonded or brazed to a substrate with the open end facing the rotating component of the gas turbine engine.

The honeycomb structure in conjunction with teeth or fingers extending radially from each of the rotating components or blades creates a seal for more efficient operation of the gas turbine engine. The honeycomb structure is abradable to accommodate slight radial growth of the rotating component caused by thermal and centrifugal forces acting upon the rotating component. Thus, the radially extending blade fingers may peel away a minute layer of the honeycomb structure. Therefore, it is important that the honeycomb structure be properly or well bonded to the substrate to prevent a large portion of the honeycomb structure from being peeled from the substrate if the radially extending fingers contact the honeycomb seal which could result in further damage to the engine. Additionally, there should be no leaks between the adjacent honeycomb cells to provide proper sealing and air flow through the engine and therefore efficient engine operation.

Thus, it is important that the honeycomb cell structure be inspected for disbonds between the cell structure and the substrate to which it is bonded or brazed.

A current inspection apparatus and method for inspecting a honeycomb cell structure is a visual inspection method which includes fixturing the part under an intense light source and viewing each of the individual honeycomb cells through a microscope or similar device for magnifying each of the cells. The operator thus visually determines if a disbond is present. This apparatus and method is dependent upon the skill and vitality of the inspector or operator who must individually observe each of the honeycomb cells. Thus, this method is slow and inefficient and fatigue of the operator can result in inspection errors. While this method may be appropriate for honeycomb cells having diameters of about 1/16" and 1/32", it is impractical for inspecting smaller honeycomb cells as small as about 1/64" in diameter.

Another method for inspecting the honeycomb cell structure involves filling each of the cells with a solvent, such as trichloroethane or the like. The honeycomb component is then rotated with the open face open to the ground. If the cell is properly bonded and sealed to the substrate, the solvent will remain within the cell. If a disbond exists, air will be allowed into the cell through adjacent cells and the solvent will fall out. This method has disadvantages in that honeycomb cells as small as 1/64" in diameter hold the solvent within the cell, even if there is a disbond, because of the surface energy within the smaller cells. Additionally, cleanup of the honeycomb structure after the inspection is necessary and the trichloroethane must be properly handled and disposed of. New environmental standards are also seeking the restrictive use of trichloroethane and similar materials hazardous to the environment which may be utilized with this method.

It is accordingly a primary object of the present invention to provide a novel apparatus and method for inspecting the bonding between a cell structure and a substrate which is not subject to the foregoing disadvantages.

It is a further object of the present invention to provide an apparatus and method for inspecting the bonding of a cell structure which is reliable, minimizes operator fatigue and operator errors and substantially reduces the inspection time over current inspection methods.

It is a further object of the present invention to provide a novel apparatus and method for inspecting the bonding between a cell structure and a substrate which is environmentally safe.

It is yet another object of the present invention to provide an apparatus and method for inspecting the bonding between a cell structure and a substrate which can be incorporated into an automated system.

These and other objects of the invention, together with the features and advantages thereof, will become apparent from the following detailed specification when read with the accompanying drawings in which like reference numerals refer to like elements.

SUMMARY OF THE INVENTION

In one aspect of the invention, a method is provided for detecting defects in a structure formed of a honeycomb matrix bonded to a support, the method comprising the steps of: providing a probe body including means defining a fluid passage therein, the fluid passage forming a supply port at an exterior surface of the probe body; connecting a pressurized fluid source to the fluid passage at a location distal from the supply port; placing the supply port in close proximity to a cell of the honeycomb matrix; supplying fluid from the compressed fluid source to the cell via the fluid passage; and monitoring a fluid pressure produced at a portion of the honeycomb matrix adjacent to the supply port to detect defects in the structure.

In accordance with another aspect of the invention, an apparatus for performing the above method is provided wherein the apparatus comprises; a probe body including means defining a fluid passage therein; means defining a supply port in a face of the probe body in fluid communication with an end of the fluid passage; a pressurized fluid source in fluid communication with an end of the fluid passage opposite from the supply port and pressure monitoring means for sensing a fluid pressure resulting from directing a pressurized fluid from the supply port into the honeycomb matrix to detect defects in the structure.

DETAILED DESCRIPTION OF THE PREFERRED EMBODIMENTS

Figure 1:
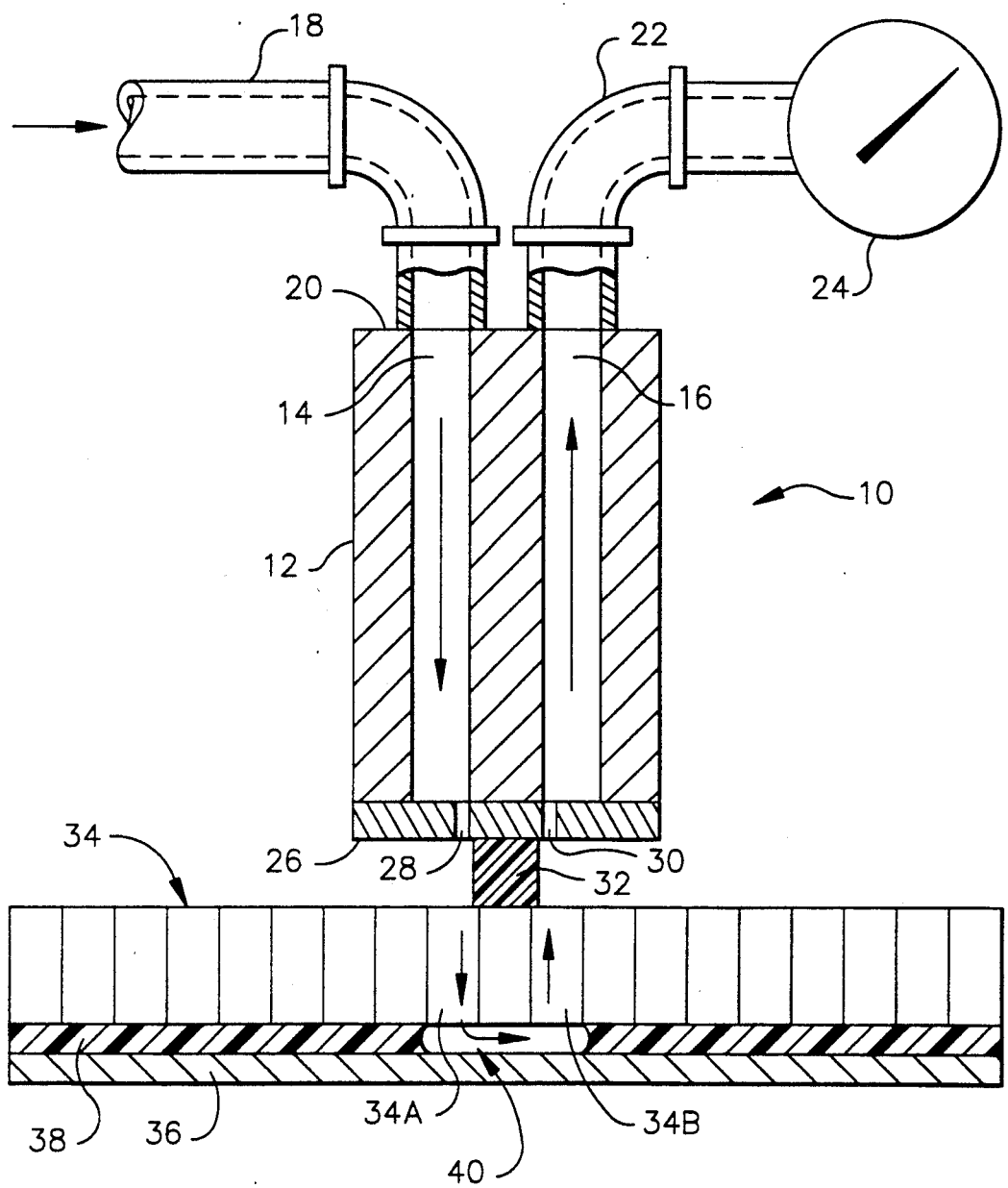
FIG. 1 is a cross-sectional, side elevation view of a first embodiment of the present invention and its use in a method of checking for defects in a honeycomb structure.

Referring to FIG. 1, a first embodiment of the present invention is illustrated including an air probe 10 and having a probe body 12 and a pair of channels or passages therethrough defining a supply passage 14 and a receptor passage 16. The supply passage 14 is connected to a tube or pipe 18 at an upper end 20 of the probe body 12 wherein the tube 18 is connected to and forms part of a source of compressed fluid. In the embodiment being described, the fluid is preferably compressed air.

A second tube 22 is connected at one end to the receptor passage 16 adjacent to the upper end 20 of the probe body 12, and the opposite end of the second tube 22 is connected to a pressure sensing means 24. It should be noted that although the pressure sensing means 24 is illustrated as a pressure meter, the sensing means 24 may also be embodied as a pressure transducer or as a pressure sensing switch which is activated when a certain minimum pressure is sensed within the receptor passage 16.

The probe body 12 further includes a lower face conforming substantially to the shape of the surface of the honeycomb matrix 34. A supply port 28 is defined in the surface 26 in fluid communication with the supply passage 14, and a receptor port 30 is similarly defined in the surface 26 in fluid communication with the receptor passage 16. The supply port 28 and receptor port 30 must be spaced apart a distance greater than the diameter of one of the cells of the honeycomb matrix 34 in order to ensure that the ports 28 and 30 are positioned over different cells at any given time. In addition, a thin rectangular wiper element 32, preferably in the form of a plastic wiper, extends across the surface 26 between the supply port 28 and the receptor port 30.

In a method of using the air probe 10 of FIG. 1, the lower face surface 26 is placed in close proximity to and spaced from the open cells of a structure defined by a honeycomb matrix 34 attached to a support substrate 36 by a bonding layer 38 wherein the bonding layer 38 may be in the form of a braze, weld, composite adhesive, or any other form of bonding material. The wiper element 32 extends between the surface 26 of the probe face and the honeycomb matrix 34 to form a fluid barrier between the supply port 28 and the receptor port 30. In addition, the wiper element 32 must have a thickness at least as great as the diameter of one of the cells of the honeycomb matrix 34.

As compressed air is supplied via the tube 18 to the supply passage 14 it is forced through the supply port 28 into the cells defining the honeycomb matrix 34. When the air probe 10 is positioned over an area which includes a disbond, such as disbond area 40 in FIG. 1, the air entering a first cell 34A of the honeycomb matrix 34 will travel through the disbond area 40 and into a closely adjacent cell 34B, and will subsequently travel upwardly into the receptor port 30 to create a pressure within the receptor passage 16 as detected by the pressure sensing means 24. Alternatively, when the bonding layer 38 is formed without any defects, the air passing from the supply port 28 will not have a path to flow to the receptor port 30 such that the pressure sensing means 24 will not be actuated.

An advantage of the present air probe 10 resides in the fact that the probe body 12 need not touch the surface of the honeycomb matrix 34 to thus facilitate friction free movement of the air probe 10 over the surface of the honeycomb matrix 34 as well as to avoid any damage which might occur as a result of contact between the probe body 12 and the honeycomb matrix 34. In addition, the wiper element 32 acts as a convenient spacer element to maintain a small air gap between the probe body 12 and the honeycomb matrix 34 as well as to provide a continuous barrier between the supply port 28 and receptor port 30.

Figure 2:
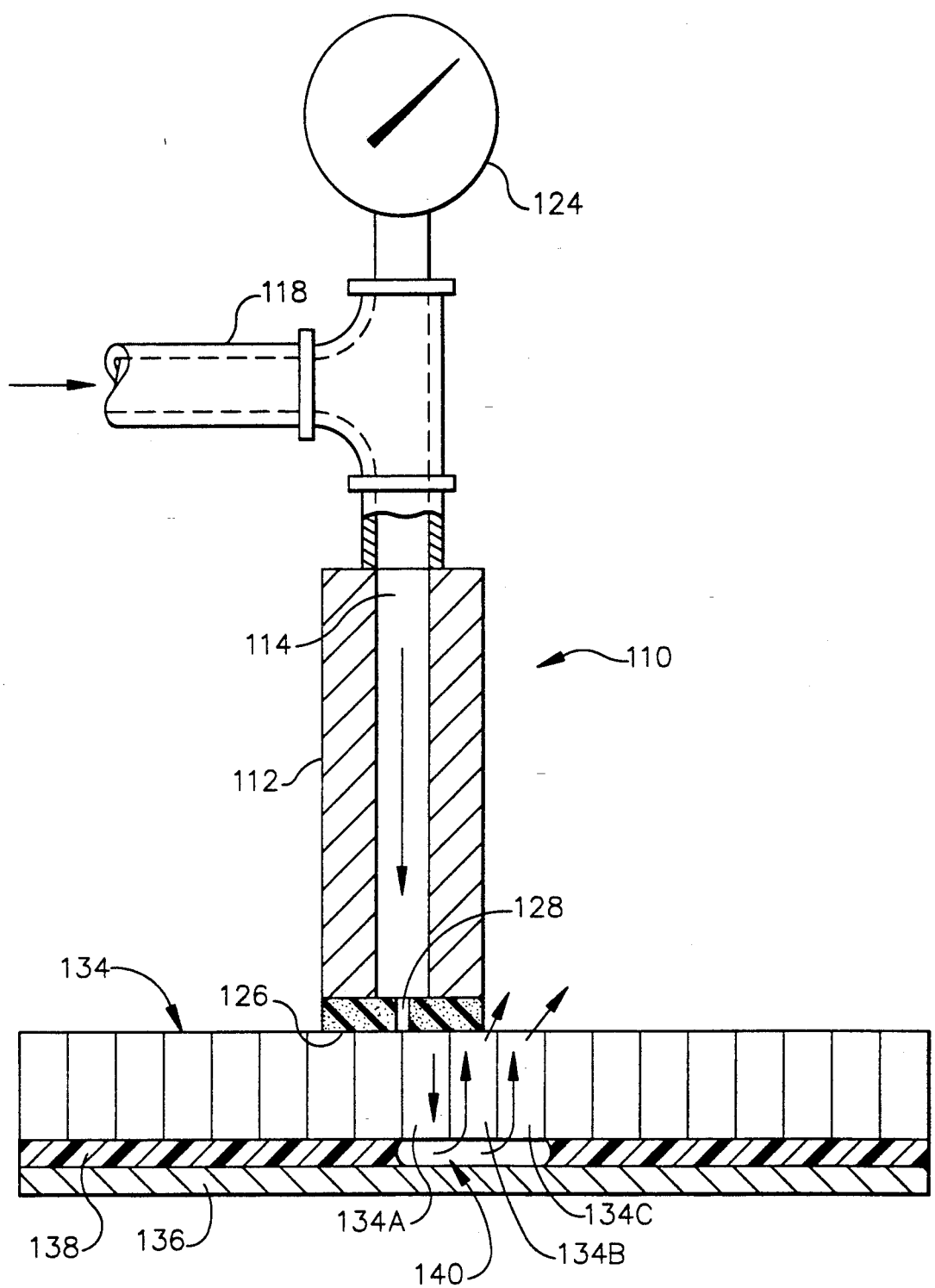
FIG. 2 is a cross-sectional, side elevation view of a second embodiment of the present invention and its use in a further method of checking for defects in a honeycomb structure.

In a second embodiment of the invention, as illustrated in FIG. 2, the air probe 110 is provided with a probe body 112 having a single supply passage 114 for supplying a compressed fluid, such as air, provided by a tube 118. A pressure sensing means 124 is connected in fluid communication with the supply passage 114 and tube 118. As in the previous embodiment, the pressure sensing means 124 may be in the form of a pressure meter, pressure switch or pressure sensing transducer.

In the embodiment of FIG. 2, the lower surface 126 of the probe body 112 may be formed of a resilient material for engaging the surface of the honeycomb matrix 134 whereby the probe body 112 may form a seal around the supply port 128 to trap pressurized gas or fluid, such as air, within the cells of the honeycomb matrix 134 which are in fluid communication with the supply port 128. The surface 126 preferably defines an area of sufficient size to form a seal around at least one cell of the honeycomb matrix 134. Thus, when the bond layer 138 is formed without defects, air supplied by the tube 118 will be trapped by the seal formed between the air probe 110 and the honeycomb matrix 134 such that a predetermined fluid pressure or back pressure will be registered by the pressure sensing means 124 upstream of the supply port 128. However, when a defect or disbond area 140 exists in the bonding layer 138, air will be permitted to flow from a first cell, such as 134A in FIG. 2, to adjacent cells, such as 134B and 134C. This flow of air out of the honeycomb matrix 134 will result in the pressure sensing means 124 sensing a reduced back pressure to indicate a defect in the bonding layer 138.

Figure 3:
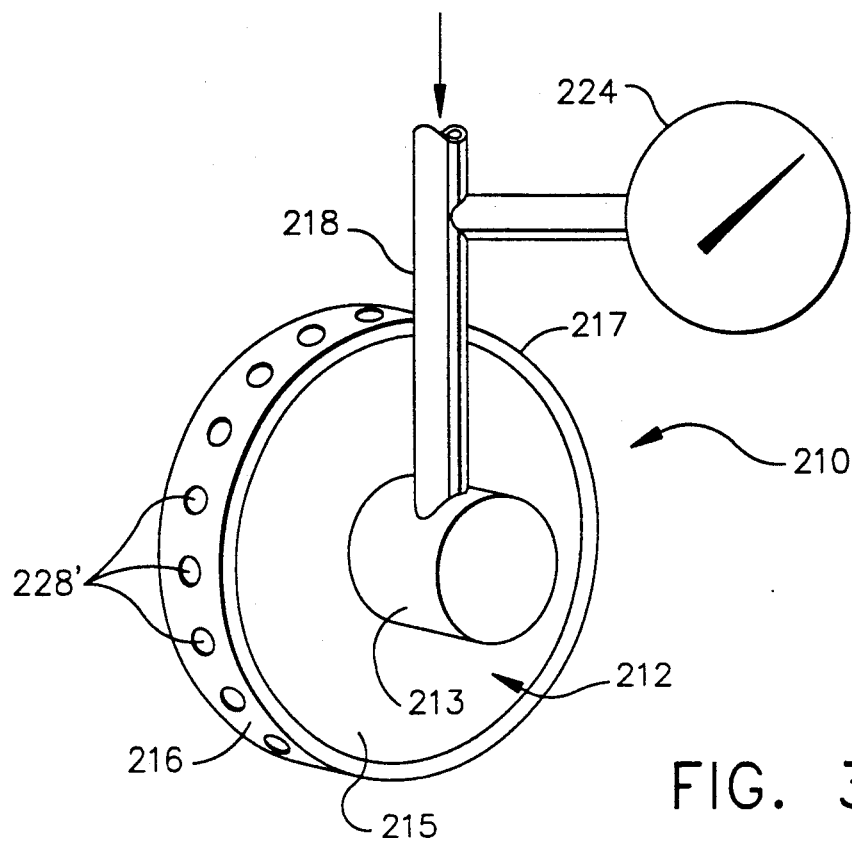
FIG. 3 is a perspective view of a third embodiment of the present invention.
Figure 4:
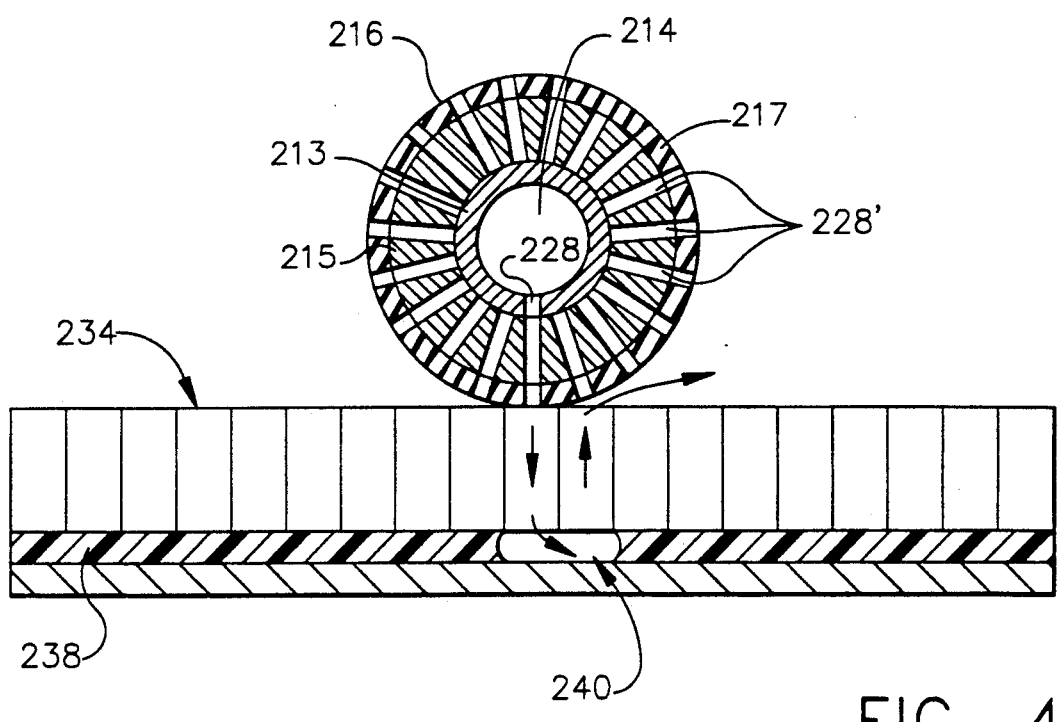
FIG. 4 is a cross-sectional, side elevation view of the embodiment of FIG. 3 showing its use in a method of checking for defects in a honeycomb structure.

FIGS. 3 and 4 illustrate a third embodiment of the present invention and includes an air probe 210 having a probe body 212 formed by an air hub 213 supporting a rotatable wheel 215. As in the previous embodiment, the probe body 212 is connected to a supply tube 218 and a pressure sensing means 224 is in direct fluid communication with the supply tube 218.

As may be best seen in FIG. 4, the hub 213 is formed with a single downwardly oriented aperture defining a primary supply port 228 and the wheel 215 extends around the hub 213 and includes a plurality of identical radially extending apertures defining a plurality of secondary supply ports 228' which are adapted to pass into alignment with the primary supply port 228 as they pass between the hub 213 and the honeycomb matrix 234. In addition, the wheel 215 is provided with an outer surface formed of a layer of resilient material 217 such as rubber whereby an effective seal is formed between the exterior surface 216 of the wheel 215 and the edges of the cells forming the honeycomb matrix 234.

Operation of the embodiment of FIGS. 3 and 4 is substantially similar to that of FIG. 2 in that compressed air may be supplied through the tube 218 to a central supply passage 214 in the hub 213, and the air is then fed through the primary supply port 228 and a secondary supply port 228' aligned therewith to feed compressed air to at least one of the cells of the honeycomb matrix 234. When there are no defects in the bonding layer 238, the pressure sensing means 224 will register a predetermined back pressure, and when a defect, such as disbond area 240 is encountered, the back pressure will drop indicating the presence of a disbond condition.

The embodiment of FIGS. 3 and 4 is particularly advantageous in that the wheel 215 of the air probe 210 may be held in continuous contact with the honeycomb matrix 234 to provide a continuous scan of the honeycomb matrix cells.

It should be noted that the probes described herein may be constructed to include multiple ports grouped together and operating according to the principles of the present invention in order to increase the speed at which the probe performs an inspection operation.

It should be apparent from the description of the above embodiments and their methods of use that the present invention provides an apparatus and a method for effectively detecting disbond conditions in honeycomb matrices. Further, it should be apparent that the present method for detecting disbond conditions may be automated by incorporating a pressure switch or pressure transducer as the pressure sensing means and connecting the pressure sensing means to a conventional computer system for monitoring the pressure produced as the probe is scanned across a honeycomb matrix surface. In addition, it should be apparent that the present invention provides a method and apparatus for detecting defects using air without requiring contact between the sensing probe and the honeycomb matrix.

While the forms of apparatus herein described constitute preferred embodiments of the invention, it is to be understood that the invention is not limited to these precise forms of apparatus, and that changes may be made therein without departing from the scope of the invention, which is defined in the appended claims.

What is claimed is:

1. A method for detecting defects in a structure formed of a honeycomb matrix bonded to a support, said method comprising the steps of:
   providing a probe body including means defining a fluid passage therein, said fluid passage forming a supply port at an exterior surface of said probe body and said probe body further including a receptor port separated from said supply port by a wiper member with a width at least as great as the diameter of one cell of said honeycomb matrix;
   connecting a pressurized fluid source to said fluid passage at a location distal from said supply port;
   connecting said receptor port to a pressure monitor;
   placing said supply port and said receptor port in respective spaced operative relation to a cell and another cell of said honeycomb matrix;
   supplying fluid from said compressed fluid source to said cell via said fluid passage; and
   monitoring a fluid pressure produced by said compressed fluid at said other cell to detect defects in said structure.

2. An apparatus for detecting disbonds in the bonding between a honeycomb matrix and a support, said apparatus comprising:
   a probe body including means defining a first fluid passage for providing a pressurized fluid source through a supply port at an end of said probe body;
   a second fluid passage in said probe body and a receptor port in said one end of said probe body in fluid communication with said second fluid passage;
   a wiper member extending from said one end of said probe body between said supply port and said receptor port to provide an air gap between said face of said probe body and the honeycomb matrix, said wiper member having a thickness at least as great as the diameter of one cell of the honeycomb matrix; and
   pressure monitoring means in fluid communication with said second fluid passage for sensing a fluid pressure resulting from directing said pressurized fluid into said honeycomb matrix, thereby detecting disbonds between the honeycomb matrix and said support.

3. The apparatus of claim 2 wherein said face is shaped to conform substantially to the shape of the honeycomb matrix.

4. An apparatus for inspecting the bonding between a cell structure and a substrate, wherein the cell structure has a multiplicity of cells which are open at one end and bonded at an opposite end to the substrate, said apparatus comprising:
   a supply passage connectable at one end to a pressurized fluid source and having a supply port at a distal end to introduce the pressurized fluid into an open end of one cell of the cell structure;
   a receptor passage having a receptor port disposed over another cell of the cell structure, wherein the pressurized fluid introduced into said one cell will leak into said other cell if a disbond exists between the cell structure and the substrate at a location between said one cell and said other cell;
   a pressure sensor associated with said receptor passage and responsive to leakage between said one cell and said one other cell to detect a disbond therebetween; and
   a wiper element disposed between said supply port and said receptor port to provide a continuous barrier between said supply port and said receptor port and to provide an air gap between the cell structure and said ports to facilitate movement of said apparatus over the cell structure open ends for substantially complete inspection thereof.

5. The apparatus of claim 4, wherein said supply port and said receptor port are spaced apart by a distance at least as long as a diameter of one cell of the cell structure.

6. The apparatus of claim 4, wherein said wiper element has a thickness at least as great as the diameter of one cell of the cell structure.

* * * * *